US011785281B2

(12) United States Patent
Trussart

(10) Patent No.: US 11,785,281 B2
(45) Date of Patent: Oct. 10, 2023

(54) SYSTEM AND METHOD FOR DECIMATION OF IMAGE DATA FOR MULTIVIEWER DISPLAY

(71) Applicant: Grass Valley Canada, Montreal (CA)

(72) Inventor: Vincent Trussart, Montreal (CA)

(73) Assignee: GRASS VALLEY CANADA, Montreal (CA)

( * ) Notice: Subject to any disclaimer, the term of this patent is extended or adjusted under 35 U.S.C. 154(b) by 112 days.

(21) Appl. No.: 17/644,529

(22) Filed: Dec. 15, 2021

(65) Prior Publication Data
US 2022/0201354 A1    Jun. 23, 2022

Related U.S. Application Data

(60) Provisional application No. 63/127,057, filed on Dec. 17, 2020.

(51) Int. Cl.
*H04N 21/43* (2011.01)
*H04N 21/431* (2011.01)
*H04N 21/44* (2011.01)

(52) U.S. Cl.
CPC ... *H04N 21/4312* (2013.01); *H04N 21/44004* (2013.01)

(58) Field of Classification Search
CPC .................................................. H04N 21/40
See application file for complete search history.

(56) References Cited

U.S. PATENT DOCUMENTS 8,200,796 B1 * 6/2012 Margulis ............ H04N 21/4122
709/217
2003/0231259 A1 * 12/2003 Yui .................... H04N 21/4316
348/564
2005/0069210 A1    3/2005 Tardif
2009/0256835 A1 * 10/2009 Moote ............ H04N 21/440263
345/418
2009/0259775 A1 * 10/2009 Faragher ................ H04N 21/47
710/26
2010/0166056 A1 *  7/2010 Perlman ............... H04N 19/436
375/E7.076

(Continued)

OTHER PUBLICATIONS

International Search Report and Written Opinion issued in connection with related application PCT/CA2021/051838, dated Mar. 29, 2022.

*Primary Examiner* — Mushfikh I Alam
(74) *Attorney, Agent, or Firm* — ARENTFOX SCHIFF LLP

(57) ABSTRACT

A system is provided for displaying content streams on a multiviewer device and includes a GPU that resizes image data loaded therein for display in a multiviewer tile, and an image decimation controller that performs a decimation of a content stream by removing a predetermined number of lines from each frame of the content stream before loading the content stream to the internal memory of the GPU for resizing and display on the multiviewer tile. In this system, the content stream is loaded to a full resolution buffer in system memory if the content stream is not a proxy stream of the media content and the tile designated for the content stream is less the predetermined threshold, such that the image decimation controller performs the decimation to delete the predetermined number of lines before the content stream is loaded in the internal memory of the GPU as the image data.

21 Claims, 6 Drawing Sheets

(56) References Cited

U.S. PATENT DOCUMENTS

| | | | |
|---|---|---|---|
| 2014/0195675 A1 | 7/2014 | Silver | |
| 2016/0119572 A1* | 4/2016 | Slupik | H04N 7/0122 |
| | | | 348/445 |
| 2016/0267940 A1 | 9/2016 | Griggs et al. | |
| 2017/0102857 A1* | 4/2017 | Badiger | G06F 3/04847 |
| 2019/0364302 A1* | 11/2019 | Perlman | H04N 19/436 |
| 2021/0134044 A1* | 5/2021 | Greene | G09G 5/026 |
| 2021/0289262 A1* | 9/2021 | O'Connor | H04N 21/4755 |
| 2022/0147228 A1* | 5/2022 | Yi | G06F 9/452 |
| 2022/0247857 A1* | 8/2022 | Wang | H04N 21/4438 |
| 2022/0286736 A1* | 9/2022 | Guruva Reddiar | H04N 21/812 |

\* cited by examiner

SYSTEM AND METHOD FOR DECIMATION OF IMAGE DATA FOR MULTIVIEWER DISPLAY

CROSS REFERENCE TO RELATED APPLICATIONS

The present application claims priority to U.S. Patent Provisional Application No. 63/127,057, filed Dec. 17, 2020, the entire contents of which are hereby incorporated by reference.

TECHNICAL FIELD

The present invention relates to image generation and memory management for a multiviewer device, and, more particularly, to a system and method for decimation of received content streams to generate image data for a multiviewer device.

BACKGROUND

In general, television production involves assembling source material such as inputs from one or more cameras, video and audio into sequences with defined transitions or graphics, to create a program. Source material for live broadcast is typically captured from multiple cameras, video servers, pre-produced material and graphics, assembled and then broadcast from a control room or stored for broadcast at a later date.

To facilitate live television production, operators will typically use a multiviewer device that can display multiple input and output sources (e.g., as tiles, which are essentially "picture-in-picture (PIP)" windows) to enable the operators to manage the available content and make real-time editing decisions to control the content to be broadcast to end consumers. For example, a typical multiviewer can concurrently present a number of input sources and at least one output source for previewing and/or for queuing a video for sending out as the broadcast signal.

Multiviewer devices use a graphics processing unit (GPU) to create and resize the images to be displayed on the display screen of the multiviewer devices. GPUs are specialized electronic circuits that are constructed to rapidly manipulate and alter their memory contents to accelerate the creation of images in a frame buffer that is configured for output to a display device (e.g., the multiviewer display screen). Existing GPUs are very efficient at manipulating computer graphics and image processing by providing a highly parallel structure that processes large blocks of data in parallel.

One technical constraints for existing multiviewers is that when media production operators want to increase the number of tiles concurrently displayed in a multiviewer display, the total image dataset (i.e., for all content streams) will increase in size, such that the memory loading constraints for the image processing places a strain on the total application's performance. As a result, when considering end-to-end application performance, GPUs are increasingly starved by slow I/O. Moreover, while the loading of data from system storage to GPU memory for processing has conventionally been by the CPU, the shift to faster GPUs has resulted in the data load leading to an increase in bottleneck to the overall performance of the multiviewer.

SUMMARY

Accordingly, a system and method is provided for displaying content streams on a multiviewer device that manages the data load to the GPU to reduce bottleneck of the overall performance. In particular, the system includes a multiviewer having a display screen with a predetermined layout configured to respectively display a plurality of contents streams in a plurality of tiles thereon, with each of the plurality of tiles having a predetermined size with a respective allocated number of total pixels; a receiver configured to receive a content stream of media content and determine whether a respective tile designated for the content stream is above a predetermined threshold defined by a total number of pixels; a graphics processing unit (GPU) having an internal memory configured to store image data, with the GPU configured to resize the image loaded in the internal memory for display in a respective tile of the plurality of tiles of the multiviewer; and an image decimation controller configured to perform a decimation of the content stream by removing a predetermined number of lines from each frame of the content stream before loading the content stream to the internal memory of the GPU for resizing and display on the respective tile of the multiviewer. Moreover, in this aspect, the receiver is configured to load the content stream to a full resolution buffer in a system memory to be transferred to the internal memory of the GPU if the respective tile designated for the content stream is above the predetermined threshold. The receiver is further configured to load the content stream to a proxy buffer of the system memory if the receiver determines that the content stream is a proxy stream of the media content and the respective tile designated for the content stream is above the predetermined threshold. Yet further, the receiver is configured to load the content stream to the full resolution buffer in the system memory if the receiver determines that the content stream is not a proxy stream of the media content and the respective tile designated for the content stream is less the predetermined threshold, such that the image decimation controller performs the decimation to delete the predetermined number of lines before the content stream is loaded in the internal memory of the GPU and resized for display on the respective tile of the multiviewer.

In an exemplary aspect of the system, the image decimation controller is configured to perform the decimation of the content stream by removing a predetermined number of horizontal lines from each frame of the content stream before loading the content stream to the internal memory of the GPU.

In another exemplary aspect of the system, the image decimation controller is configured to perform the decimation based on a dynamic decimation factor that sets the predetermined number of horizontal lines from each frame to be removed.

In another exemplary aspect of the system, the dynamic decimation factor is set based on a size of the received content stream with a first decimation factor being applied to tiles having a first size and a second decimation factor that is less than the first decimation factor and that is applied to tiles having a second size that is physically smaller than the first size.

In another exemplary aspect of the system, the predetermined threshold is based on one of a relative size or ratio of the respective tile designated for the content stream compared to the display screen with the predetermined layout.

In another exemplary aspect, the system further includes a content transcoder communicatively coupled to the multiviewer and configured to resize the content stream before transmitting the resized content stream to the receiver.

In another exemplary aspect of the system, the plurality of tiles are configured to display a plurality of content streams including at least one content stream from a content generating device and at least one composite video image that displays the at least one content stream with a video effect applied thereto.

According to another exemplary embodiment, a system is provided for displaying content streams on a multiviewer device. In this aspect, the system includes a receiver configured to receive a content stream of media content and determine whether a respective tile of a multiviewer that is designated for the content stream is above a predetermined threshold defined by a total number of pixels of an image frame of the content stream; a graphics processing unit (GPU) having an internal memory configured to store image data, with the GPU configured to resize the image data loaded in the internal memory for display in the respective tile of the multiviewer; and an image decimation controller configured to perform a decimation of the content stream by removing a predetermined number of lines from each frame of the content stream before loading the content stream to the internal memory of the GPU as the image data for resizing and display on the respective tile of the multiviewer. Moreover, the receiver is configured to load the content stream to a full resolution buffer in a system memory to be transferred to the internal memory of the GPU if the respective tile designated for the content stream is above the predetermined threshold, the receiver is configured to load the content stream to a proxy buffer of the system memory if the receiver determines that the content stream is a proxy stream of the media content and the respective tile designated for the content stream is above the predetermined threshold, and the receiver is further configured to load the content stream to the full resolution buffer in the system memory if the receiver determines that the content stream is not a proxy stream of the media content and the respective tile designated for the content stream is less the predetermined threshold, such that the image decimation controller performs the decimation to delete the predetermined number of lines before the content stream is loaded in the internal memory of the GPU as the image data.

According to another exemplary embodiment, a system is provided for displaying content streams on a multiviewer device. In this aspect, the system includes a graphics processing unit (GPU) having an internal memory configured to store image data, with the GPU configured to resize the image data loaded in the internal memory for display in the respective tile of the multiviewer; and an image decimation controller configured to perform a decimation of a content stream of media content by removing a predetermined number of lines from each frame of the content stream before loading the content stream as the image data to the internal memory of the GPU for resizing and display on a respective tile of a multiviewer. According to the exemplary aspect, the content stream is loaded to a full resolution buffer in a system memory to be transferred to the internal memory of the GPU if a tile of the multiviewer that is designated for the content stream is above a predetermined threshold defined by a total number of pixels of an image frame of the content stream. Moreover, the content stream is loaded to a proxy buffer of the system memory if the content stream is a proxy stream of the media content and the tile of the multiviewer designated for the content stream is above the predetermined threshold. Yet further, the content stream is loaded to the full resolution buffer in the system memory if the content stream is not a proxy stream of the media content and the tile of the multiviewer that is designated for the content stream is less the predetermined threshold, such that the image decimation controller performs the decimation to delete the predetermined number of lines before the content stream is loaded in the internal memory of the GPU as the image data.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
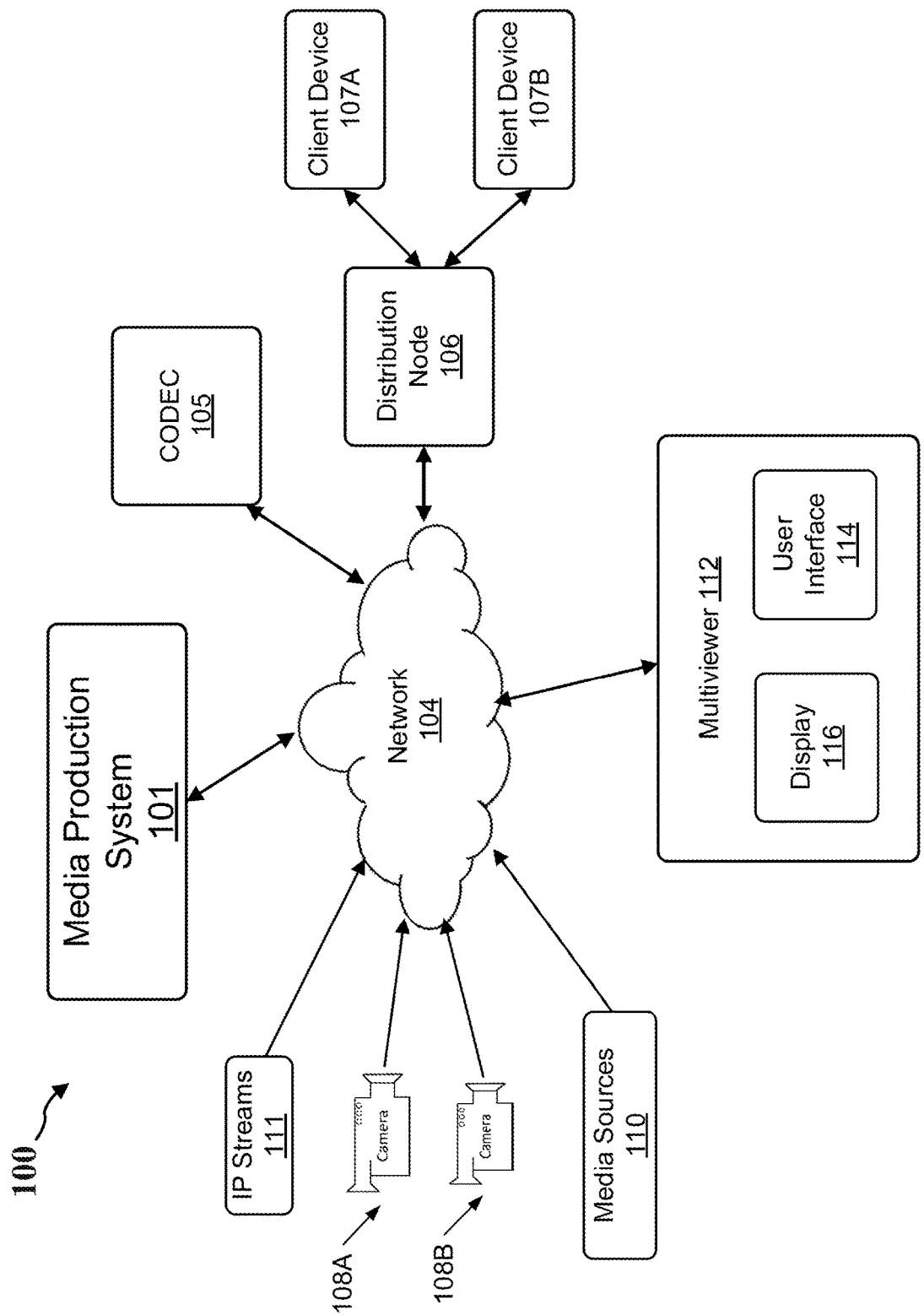
FIG. 1 illustrates a block diagram of a media production system for decimation of received content streams to generate image data for a multiviewer device according to an exemplary aspect.

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

In general, certain aspects of a system and method for decimation of received content streams to generate image data for a multiviewer device will now be presented with reference to various systems and methods. These systems and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

FIG. 1 illustrates a block diagram of a media production system for decimation of received content streams to generate image data for a multiviewer device according to an exemplary aspect. In particular, a media production system 100 is shown that can provide an integrated, non-linear production solution having combined functionality of any combination of switcher functionality, video server/clip store functionality, graphics engine functionality, and multiviewer functionality. Production elements provided via the integrated, non-linear production solution provide a simplified way of working with the main building blocks of live production.

In general, media content provided for production according to system 100 can generally be referred to as "essence", which denotes media that can be consumed by a user (e.g., a video clip, an audio clip, and/or ancillary data such as captions). As shown, the system 100 includes a media production system 101, which can provide production switching functionality (e.g., a production switcher) for facilitating video production on a user interface in terms of applications and components of the system and the connections between them for consumption of media essence by end users. The media production system 101 can be configured as a software based environment or engine that can be provided in a cloud-computing environment, remote production center, production truck or the like, as would be appreciated to one skilled in the art.

It is also noted that the exemplary embodiment is described in the context of media production and specifically live or real-time media production or broadcast. In general, it should be understood that the media production system 101 is configured to facilitate streamlined and efficient media production for a technical director (TD). Thus, the media production system 101 can generally be located remotely from all of the other components in the system and, in some embodiments, coupled to the components (which can be part of a cloud computing environment) to effectively control the system.

As shown, system 100 includes a plurality of content generating devices 108A and 108B. In an exemplary aspect, the plurality of content generating devices 108A and 108B can be configured for providing A/V feeds across data communication links via the network 104. Moreover, it is noted that while only two devices are shown, the system 100 can be implemented using any number of content generating devices. The plurality of content generating devices 108A and 108B can be, for example, remote cameras configured to capture live media content, such as live events and/or the "talent" (e.g., news broadcasters, game commentators, or the like). Additional, content generating devices (e.g., devices providing IP streams 111) can include Esports (electronic sports) real-time content, or the like. Moreover, the system can also receive content streams from additional media sources 110, such as remote video servers that are configured to store media content and distribute this content through the media distribution system 100. Thus, the plurality of content generating devices 108A and 108B can more generally be considered as content providing devices, such as video servers.

In operation, each of the plurality of content generating devices are configured to transmit media content streams containing essence over network 104 as part of the live media production environment. Moreover, in an exemplary aspect, the devices can be configured to encode the media content streams in different formats for different purposes. For example, in one aspect, the media content streams can be transmitted in a high-definition (HD) format. The plurality of content generating devices can also be configured (e.g., by use of an encoder) to format and transmit the media content streams as proxy signals (e.g., at a lower resolution than HD). In general for purposes of this disclosure, a proxy signal can be considered a media content stream of the media essence that is configured at a lower resolution than a high-definition (HD) format. As will be described in detail below, a multiviewer 112 can be configured to receive these differently formatted media content streams over the network 104 and scale them as needed before GPU processing (e.g., resizing of the image frames) to generate image data for display on the multiviewer display screen.

In particular and as further shown, the plurality of content generating devices 108A, 108B, 110 and/or 111 can be coupled to a communication network 104, such as the Internet, and/or hardware conducive to internet protocol (IP). That is, system 100 can be comprised of a network of servers and network devices configured to transmit and receive video and audio signals of various formats. In one aspect, the processing components of system 100 can be executed in part of a cloud computing environment, which can be coupled to network 104. Moreover, the media production system 101 can be configured to access the video and audio signals and/or feeds generated by the content generating devices 108A, 108B, 110 and/or 111, or information related to the various signals and content presented therein, as will be described in detail below.

In general, cloud computing environments or cloud platforms are a virtualization and central management of data center resources as software-defined pools. Cloud computing provides the ability to apply abstracted compute, storage, and network resources to the work packages provided on a number of hardware nodes that are clustered together forming the cloud. Moreover, the plurality of nodes each have their specialization, e.g., for running client micro-services, storage, and backup. A management software layer for the application platform offered by the cloud will typically be provided on a hardware node and will include a virtual environment manager component that starts the virtual environments for the platform and can include micro-services and containers, for example. Thus, according to an exemplary aspect, one or more of the components (or work packages) of system 100 that can be implemented in the cloud platform as described herein.

As yet further shown, system 100 can include one or more remote distribution node(s) 106 (e.g., one or more remote production switchers or routers), which can be implemented as hardware components at various geographical locations or, in the alternative, as processing components as part of a cloud computing environment. The one or more distribution nodes 106 are configured to distribute the production media content from the media production system 101 to one or more distribution nodes (e.g., remote media devices), such as client devices 107A and 107B, which can be content consuming devices (e.g., televisions, computing devices, smart phones or the like) with web browsers or similar display applications configured to display the broadcast content thereon. It should also be appreciated that while only two client devices 107A and 107B are shown, the system 100 and network can include any number of content consuming devices configured to receive and consume (e.g., playout) the media content, with such content consuming devices even being distributed across different countries or even different continents. As a result, the system 100 can be configured as a media network for real-time production and broadcasting of video and audio content. Moreover, in this network, the media production system 101 can include one or more media processing node(s) and media processing functionality, which may include a mix/effects engine, keyer or the like, for performing video processing and editing functions on the received content streams.

Yet further, system 100 can include additional components that are typically included a video production system that are well known to those skilled in the art. For example, system 100 can include one or more codecs 105 configured to encode the video signals at a particular compression format for the transmission to satisfy the media request parameters. The codec 105 can be embedded in any of the various media production components (e.g., a remote video switcher or router or the multiviewer 112) or alternatively be provided as a standalone component. In general, such codecs are configured to perform encoding of video and audio data into data packets for transmission over IP in the media distribution network. In some examples, codecs may encode video and audio data into non-compressed (e.g., linear pulse code modulation, pulse-density modulation, direct stream digital pulse-amplitude modulation, etc.), lossless (e.g., free lossless audio codec, optimFROG, wavepak, true audio, etc.), and lossy (e.g., adaptive differential (or delta) pulse-code modulation, adaptive transform acoustic coding, MPEG-1, MPEG-2, MPEG-3, MPEG-4, etc.). As will be described in more detail below, codec 105 can be configured to resize high-resolution content stream to a proxy format and transfer the reformatted content to system memory (e.g., of multiviewer 112) according to an exemplary aspect.

Moreover, in an exemplary aspect, the media production system 101 can be configured to provide a graphic engine functionality that generates, among others, real time 2D/3D graphics, overlays, and authoring tools. Such graphics may include simple graphic elements such as logos, as well as more complex graphics such as sports scores, final standings for events being broadcast, and other complex effects having sources from different sources.

As further shown, the system can include multiviewer 112 that further can include a user interface 114 and/or display 116. In one aspect, the user interface 114 may be graphical user interface with touchscreen control on display screen 116. Moreover, the multiviewer 112 can be provided on a computing device and can be provided locally with the media production system 101 and/or can be located remotely from the media production system 101 and communicatively coupled thereto over network 104 (e.g., in a cloud computing environment).

According to an exemplary aspect, the multiviewer 112 is configured to provide, among others, live monitoring of input media sources and/or output media sources (generally referred to as "content streams" as noted above) by providing a plurality of tiles or windows on display screen 116 of the respective input and output sources. Each of these aspects of functionality may be integrated and presented to an operator via a simplified user interface on display screen 116. Moreover, this simplified user interface may comprise live production workflows that enable an operator to make live broadcast production decisions in an intuitive manner.

Thus, according to an exemplary aspect, the media production system 100 can receive media source inputs (e.g., media essence) from media sources (e.g., content generating devices 108A and 108B), such as live input from multiple cameras. The media production system 100 can also have access to other pre-produced sources, such as stored video or audio clips that can be delivered via SDI or internet protocol (IP) streaming (e.g., content generating devices 110 and/or IP streams 111) as also described above. The input sources may be received at media production system 101, which can also be configured to receive user selections of production elements from user interface 114, for example.

As shown, the media production system 101 can be operatively connected to multiviewer 112 that is configured to present or display to the user with a plurality of input sources (e.g., 64 individual tiles or windows of media contents streams on display screen 116). These content streams can be displayed on the display screen 116 in different formats or resolutions, such as high-definition and proxy formats as described above. The multiviewer 112 can have a predetermined layout for the plurality of tiles to be displayed thereon. Moreover, each tile (which can vary in size) has an allocated total number of pixels that is based on the physical size of that tile. Conventionally, if a multiviewer 112 receives a proxy signal (e.g., low resolution format) of a content stream and the total pixels in that format is greater than the allocated total number of pixels for the designated tile in the multiviewer layout, the multiviewer 112 is configured to downscale the image data to fit the proxy content stream to the designated tile. This resizing of image frames can be performed by the processing engine (i.e., the GPU) of the multiviewer as described below. According to an exemplary aspect, the multiviewer 112 is further configured to perform decimation of a content stream in a proxy format, for example, before the image data is loaded into the memory of the processing unit (i.e., the GPU) of the multiviewer 112 that resizes and reformats the frame data for display on the designated tile of the display screen 116 of the multiviewer 112. The details of this configuration will be described in more detail below.

In one exemplary aspect, the multiviewer 112 can also be configured to present a preview of a composite scene based on the user's selection of production elements as is known to one skilled in the art. For example, the preview may be displayed in a stage window within user interface 114 of multiviewer 112. The operator can then modify the previously built composite scene by changing selections at the control apparatus (e.g., by user interface 114 or a separate interface for media production system 101). As the operator makes the changes, the stage window can update the display to show a modified version of the composite scene. Thus, the stage window can continuously shows a current version of the composite scene. This allows an operator to build and preview a scene without being on air. The developed scene can then be used for the actual broadcast through a single selection, with one hit of a button, for example on user interface 114.

As described above, the different tiles (i.e., PIP windows) displayed on the display screen 116 of the multiviewer 112 can have different sizes (e.g., physical heights and widths) of allocated total pixels and thus use different amounts of real estate on the overall screen. In other words, each tile will be allocated a ratio of total real estate of the overall screen. In the exemplary aspect and as described in more detail below, the processing components of the multiviewer 112 can be configured to perform a decimation of the image data for proxy streams (i.e., content streams in proxy format) when the size (e.g., resolution) of the particular proxy stream is less than the tile size. This decimation is performed before this image data is loaded by a direct memory access (DMA) engine into the GPU memory for processing and resizing to be displayed on the screen 116 of the multiviewer 112. By doing so, the total memory load from system memory to GPU memory can be advantageously reduced when generating the image tiles on the multiviewer 112.

In operation and during media production, when the user is satisfied with the composite images in the stage window, the user can make a selection to output the composite scene for broadcast. Upon such a selection, all selected production elements may be applied by media production system 101 and output to the distribution node 106 and ultimately to client devices 107A and/or 107B, for example. An exemplary system for generating composite broadcast content is described in U.S. Pat. No. 9,318,149, entitled "Method and System of Composite Broadcast Control", the entire contents of which are hereby incorporated by reference.

As described above, processing elements of the multiviewer 112 are configured to control the display of a plurality of tiles (e.g., video sources) on a display screen as a single display. Moreover, it is known that digital video content is comprised of a plurality of video frames composed of a plurality of picture elements with each horizontal row of picture elements forming a line. The product of the number of lines and the number of maximum sine signals per line is known as the total resolution of the frame. It is also understood that the higher the resolution, the closer the displayed image is to the original image. However, higher resolution introduces technical problems, such as additional consumption of video processor resource usage when the image data is loaded from system memory into GPU memory. The exemplary multiviewer 112 balances these factors with a configuration that manages video sources (e.g., inputs and/or outputs) being displayed on a screen 116 of the multiviewer 112 and when displayed given the small size (e.g., if there are 64 individual tiles) when being viewed by the operator of the multiviewer 112. In particular, based on the size of each individual tile displayed thereon, the processing components of the multiviewer 112 can be configured to perform a decimation of horizontal lines of each frame in respective video proxy streams before loading the image data into memory of the GPU that resizes the image data to be displayed on the respective tile of the display screen 116 thereof.

Figure 2:
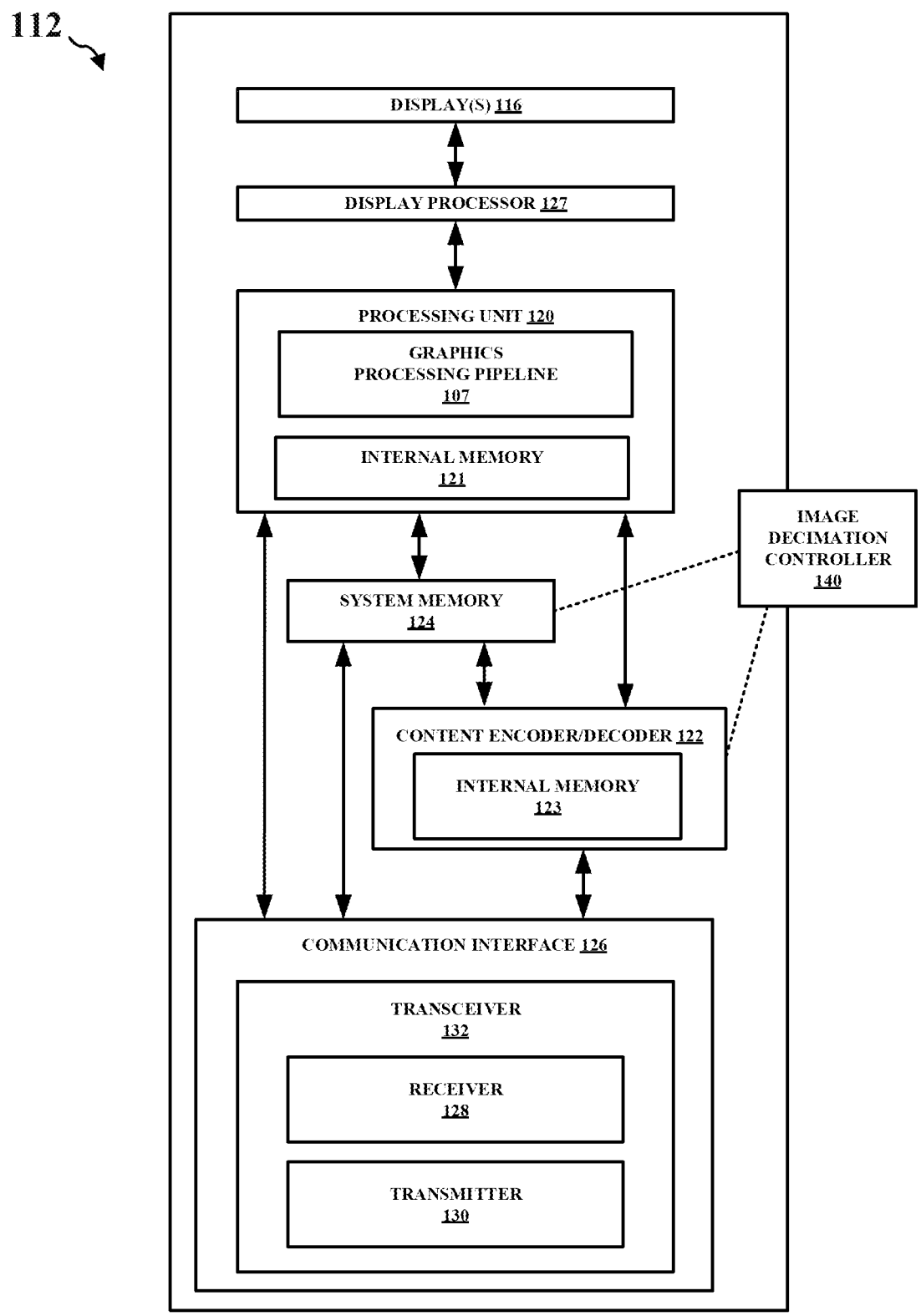
FIG. 2 is a block diagram that illustrates an example multiviewer for decimation of received content streams to generate image data for a multiviewer device according to an exemplary aspect.

FIG. 2 is a block diagram that illustrates an example multiviewer 112 for decimation of received content streams to generate image data according to an exemplary aspect. In general, the multiviewer 112 can include one or more components or circuits for performing various functions described herein, and, in particular, can include one or more components configured to perform one or more techniques of this disclosure. In the example shown, the multiviewer 112 can include a processing unit 120, a content encoder/decoder 122 (e.g., a transcoder), and a system memory 124. In some aspects, the multiviewer 112 can include additional components, including a communication interface 126, a transceiver 132, a receiver 128, a transmitter 130, a display processor 127, and one or more displays 114. In some exemplary aspects, these components can be implemented as separate components (e.g., as cloud computing components) within the media production system 100 described above.

Moreover, it is noted that the display 116 corresponds to the display screen 116 described above with respect to FIG. 1, for example, and that the display processor 127 can be configured to display the output from processing unit 120 thereon. In another example, the graphics processing and results therefor may not be displayed on the multiviewer 112 itself, but instead the multiviewer 112 can be configured to receive the graphics processing results from to another device, such as a separate graphics processing unit, which may even be included in the media production system 101 in one exemplary aspect.

According to the exemplary aspect, the processing unit 120 includes internal memory 121, i.e. GPU memory. Moreover, the processing unit 120 is configured to perform graphics processing, i.e., in graphics processing pipeline 107 in order to resize the media content streams to be displayed on the display 116 according to an exemplary aspect. The content encoder/decoder 122 may include an internal memory 123. In an exemplary aspect, the display processor 127 can be configured to perform one or more display processing techniques on one or more frames generated and/or resized by the processing unit 120 before presenting the respective content streams as tiles or PIP windows on the display 116 of the multiviewer 112.

Memory external to the processing unit 120 and the content encoder/decoder 122, such as system memory 124, is accessible to the processing unit 120 and the content encoder/decoder 122. For example, the processing unit 120 and the content encoder/decoder 122 may be configured to read from and/or write to system memory 124 as part of a GMA operation, for example. The processing unit 120 and the content encoder/decoder 122 may be communicatively coupled to the system memory 124 over a bus, for example.

The content encoder/decoder 122 can further be configured to receive video content from any source, such as the system memory 124 and/or the communication interface 126. The system memory 124 can be configured to store received encoded or decoded graphical content that is received from the content generation devices (e.g., content generating devices 108A, 108B, 110 and/or 111) as described above. The content encoder/decoder 122 may be configured to receive encoded or decoded graphical content, e.g., from the system memory 124 and/or the communication interface 126, in the form of encoded image data.

The internal memory 121, internal memory 123 and/or the system memory 124 can include one or more volatile or non-volatile memories or storage devices. In some examples, internal memory 121, internal memory 123 and system memory 124 may include RAM, SRAM, DRAM, erasable programmable ROM (EPROM), electrically erasable programmable ROM (EEPROM), flash memory, a magnetic data media or an optical storage media, or any other type of memory.

According to an exemplary embodiment, the processing unit 120 is a graphics processing unit (GPU) configured to perform graphics processing of the media content streams for display by the multiviewer 112 as described above. In particular, during operation, the GPU 120 can be configured to resize or scale the media content streams to be displayed or their respective and designated tiles of the screen 116 of the multiviewer 112. In some examples, the GPU 120 may be integrated into a motherboard of the multiviewer 112, but in other aspect, the GPU 120 can be incorporated within a peripheral device configured to interoperate with the multiviewer 112 as described above.

It is further noted that if the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

In the exemplary embodiment, the multiviewer 112 includes a communication interface 126 that can include a receiver 128 and a transmitter 130. The receiver 128 may be configured to perform any receiving function described herein for receiving the video content streams of essence over network 104 as described above with respect to FIG. 1. Moreover, the transmitter 130 may be configured to perform any transmitting function described herein with respect to the device 104. For example, the transmitter 130 may be configured to transmit information to another device, which may include a request for content, instructions to media production system 101 (e.g., the broadcast a composite video image for media production) or the like. The receiver 128 and the transmitter 130 may be combined into a transceiver 132. In such examples, the transceiver 132 may be configured to perform any receiving function and/or transmitting function described herein with respect to the device 104.

Referring further to FIG. 2, an image decimation controller 140 is configured to control decimation of the proxy content streams depending on the size of the stream to be displayed on the screen 116 of the multiviewer 112. According to an aspect, the image decimation controller 140 is configured to perform decimation of a predefined number of lines in each frame of certain video source content streams before the image data is loaded (e.g., by a DMA engine of the GPU 120) into the GPU's internal memory 121 before it is processed by the graphic processing pipeline 107. That is, based on preconfigured thresholds, the image decimation controller 140 can be configured to remove a predefined number of lines (e.g., one of every four lines) in each frame of image data before the proxy content stream is loaded from system memory 124 (or internal memory 123 of content encoder/decoder 122) to internal memory 121 of GPU 120. By doing so, the image decimation controller 140 reduces the total memory load and memory bandwidth of GPU 120.

Figure 3:
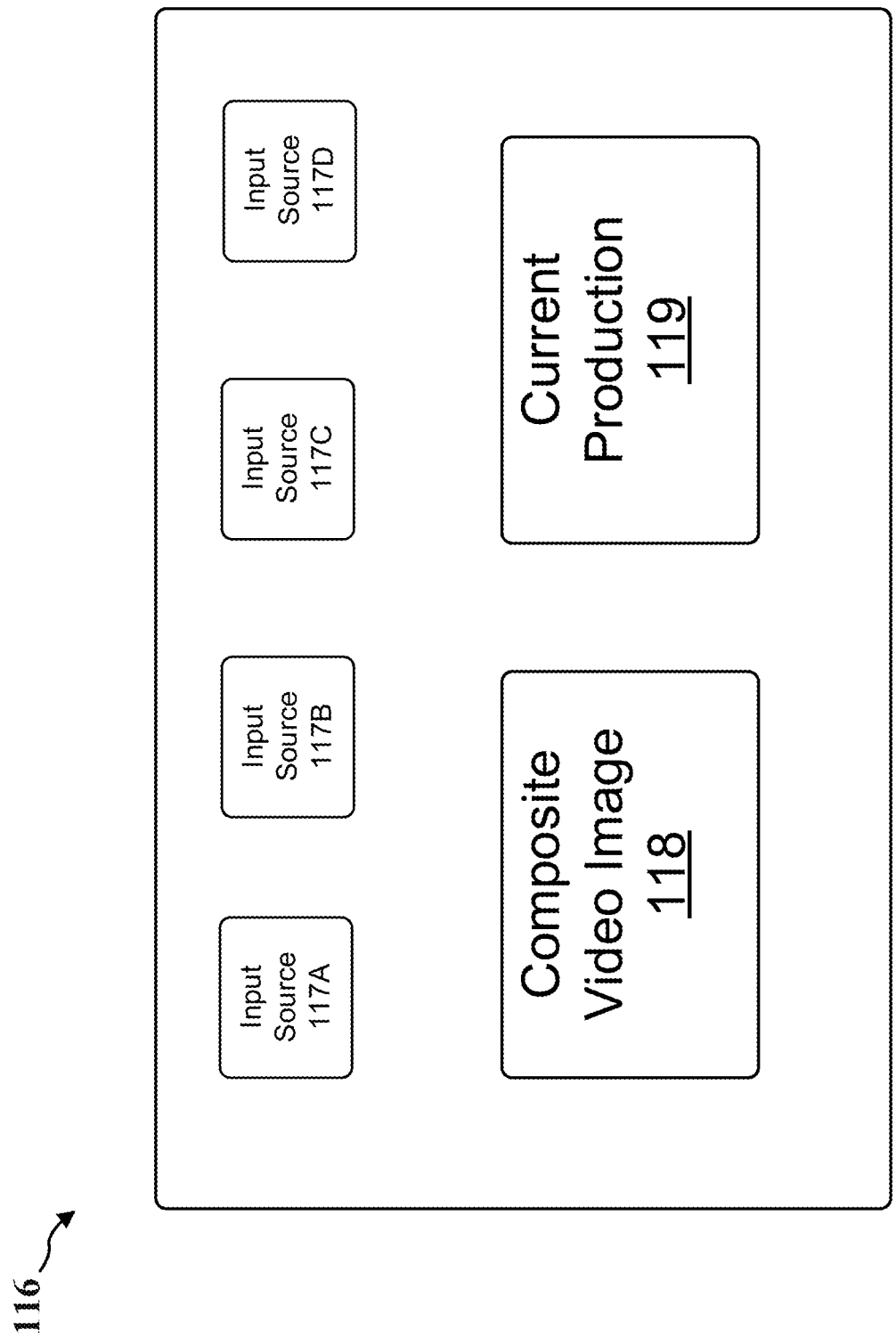
FIG. 3 illustrates a block diagram of an example display of a multiviewer according to an exemplary aspect.

FIG. 3 illustrates an example display of a multiviewer 112 according to an exemplary aspect. In particular, FIG. 3 illustrates an example of display screen 116 for multiviewer 112 as described above. In this example, the display includes six separate tiles for the different video sources to be displayed to a user during a live production. It is noted that the relative size of each of the tiles is drawn to scale in this example. In other words, the tiles for input sources 117A to 117D are smaller (in physical size) than tiles 118 and 119.

In this example, four input sources 117A-117D are shown and can correspond to the image content provided by one or more of the received content from content generating devices 108A, 108B, 110 and/or 111, as described above. In addition, a fifth tile is provided to display the composite video image 118, which can corresponding to the staging window as also described above. In other words, the content in staging window may correspond to one of the selected input sources (e.g., from one content generating devices 108A, 108B, 110 or 111) with some additional video effects applied thereto. The display 116 can also include a tile for the current production that is being output and broadcast by system 100. It is noted that while only six tiles (or windows) are provided in the display screen 116 in this example, the multiviewer 112 can be configured to display additional tiles (e.g., 16, 32 or 64 tiles) in alterative aspects and that the six tiles shown in FIG. 3 should not be so limited.

As described above, the multiviewer 112 can include a GPU 120 that is configured to execute graphics processing pipelines 107 (or similar image processing functions) that include one or more processing stages that operate together to execute graphics processing commands and output frames for each of the received media streams. An example of such image processing is that each received content stream needs to be resized or scaled to fit the physical size of the designated tile for that stream on the display 116 of the multiviewer 112.

In general, GPUs gain performance efficiencies for executing such processes by using parallel hardware to run tasks for these processes in parallel. Thus, for multiviewer 112, the GPU 120 is configured to execute such graphics processing pipelines for the received media content streams to resize the tiled views on the display screen 116 for each media content source (e.g., input sources, output sources, composite video images, and the like). However, as the number and/or complexity of streams to be displayed on the screen 116 increases, there is a need to manage the throughput and bandwidth of memory 121 for image data through the GPU 120 of the multiviewer 112 to minimize delay and maintain real-time display for live production with minimal latency.

Thus, according to the exemplary aspect, the image decimation controller 140 is configured to perform a decimation operation on certain image content streams (i.e., proxy content streams) based on the physical display size of that particular stream on the screen 116 of the multiviewer 112.

Figure 4:
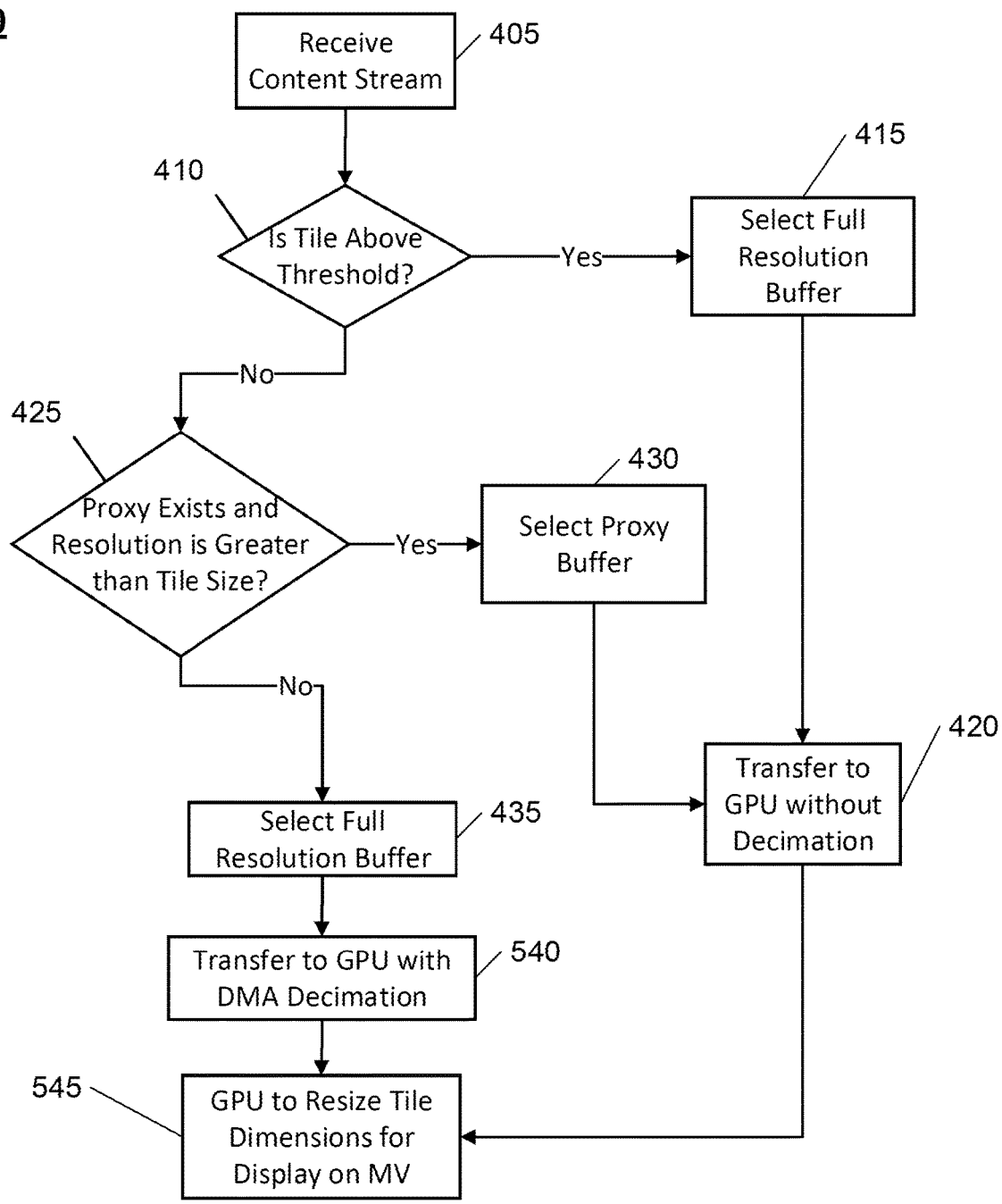
FIG. 4 illustrates a flowchart for a media production method for decimation of received content streams to generate image data for a multiviewer device according to an exemplary aspect.

FIG. 4 illustrates a flowchart for a media production method for decimation of received content streams to generate image data for a multiviewer device according to an exemplary aspect. It is noted that the claimed method can be implemented using the systems and components described above with respect to FIGS. 1 and 2.

Initially, at step 405, one or more media content streams are received by a multiviewer 112, such as by communication interface 126, for example. As noted above, each content stream (from the content generating devices) is designated for a respective tile of the display screen 116, which can be designated by user inputs in user interface 114, for example. That is, the user can preconfigure the display screen 116 to associate certain inputs and outputs with specific tiles (e.g., a user customized layout) for the multiviewer display. At step 410, the multiviewer 112 (e.g., communication interface 126) is configured to determine whether the respective tile for the received content stream is above a predetermined threshold. In one exemplary aspect, this predetermined threshold may be defined based on a total number of pixels. That is, if each frame of the received content stream that is designated to be displayed as a tile is above this set number of total pixels, the method proceeds to step 415 in which a full resolution buffer is selected. It is noted that the full resolution buffer may be a region of the system memory 124 designated for high resolution content.

In an alternative aspect, the predetermined threshold used at step 410 can be based on the relative size or ratio of the tile to the overall size of the display screen 116 of the multiviewer 112. For example, referring to FIG. 3, each of tiles 118 and 119 may have a physical size that is one-eighth the total size of the display screen 116, whereas each of tiles 117A to 117D may have a physical size that is one-thirty second the total size of the display screen 116. Moreover, the predetermined threshold may be set to one-fifth the total size of the display screen 116. In this instance, the content streams to be displayed on tiles 118 and 119 will be above the predetermined size threshold and result in a YES for step 410. In contrast, the content streams to be displayed on tiles 117A to 117D will be below the predetermined size threshold and result in a NO for step 410. In general, it is noted that the type threshold can be selected according to these and other different types of implementation aspects.

As further shown, at step 420, the image data is loaded or otherwise transferred from the full resolution buffer of system memory 124 to the GPU memory 121 at step 420 without performing decimation to maintain the high resolution format, for example. The method then proceeds to step 545 where the GPU 120 is configured to resize the image content loaded in GPU memory 121 for display on multiviewer 112 and in the specifically designated tile. As described above, the resized frames can be displayed by display processor 127 in the respective tile of the multiviewer display screen 116.

Referring back to step 410, if the tile is not above the predetermined threshold, the method proceeds to step 425. In this step, if the received content stream is determined as a proxy stream (e.g., at a lower resolution format than the original content) and the size of images frames of the proxy stream is greater than the size of the designated tile for the proxy stream, the method proceeds to step 430 where a proxy buffer is selected, which may be a region of the system memory 124 designated for proxy content. In this case, decimation is not performed to maintain the resolution of the proxy stream. Thus, the proxy stream is then loaded from system memory 124 to GPU memory 121 at step 420 without decimation. The method then proceeds to step 545 where the GPU 120 performs resizing of the proxy stream in a similar manner as described above.

Referring back to step 425, if the proxy does not exist or the size of the proxy stream is not greater than the tile size, the method proceeds to step 435 in which the full resolution buffer is again selected and the content stream is loaded therein. At step 540, the image decimation controller 140 can be configured to perform the decimation (e.g., horizontal decimation) on the content stream. In other words, the image decimation controller 140 can be configured to remove every fourth line, for example, of picture elements from image data of that content stream before loading the content stream to GPU memory 121 for resizing at step 545 and subsequent and display on the multiviewer 112.

It should be appreciated that the decimation factor (e.g., which lines and the number of lines will be removed) can also be predetermined. For example, based on the size content stream, a first decimation factor (e.g., one of every four lines is removed) may be applied, where smaller tiles may have a second decimation factor (e.g., one of every two lines is removed). This is because the tiles are physically smaller (when displayed on the screen tiles, i.e., less total pixels) for the input sources so removing more lines than the larger tiles will not be noticeable to the user during operation. As a result, based on the physical picture dimensions (e.g., height and/or width) of each tile, the multiviewer 112 is configured to adaptively scale the different content sources in order to increase the total number of streams concurrently processed and resized through GPU 120.

According to an exemplary embodiment, the decimation can be performed as the multiviewer 112 ingests the content streams, for example, as part of the decoding process performed by content encoder/decoder 122. That is, the image decimation controller 140 can configure the content encoder/decoder 122 to pre-decimate the media streams as part of receiving process. For example, in one aspect, the user can input instructions on user interface 114 to configure the number of content streams on screen 116 and can also designate which streams are displayed on which tiles. In turn, the image decimation controller 140 can be configured to select a decimation factor for one or more proxy content stream that can be based on the physical size of the particular tile designated by the user. Effectively, the decimation factor (i.e., the number of lines removed from each frame of image data) is set based on the size of the designated multiviewer tile.

Yet further, it is noted that while the content encoder/decoder 122 is provided as a component of multiviewer 112 according to the exemplary embodiment shown in FIG. 1, the content encoder/decoder 122 can be a separate component that is communicatively coupled to the multiviewer 112. In fact, in one aspect, the content encoder/decoder 122 can be located remotely from multiviewer 112 (e.g., codec 105 shown in FIG. 1) and can receive the content streams from content generating devices 108A, 108B, 110 and/or 111. The content encoder/decoder 122 can then be configured to resize the content streams before transmitting these streams (e.g., over network 104) to multiviewer 112 to be processed (i.e., using the decimation algorithm described in FIG. 4) for display on display screen 116.

Figure 5:
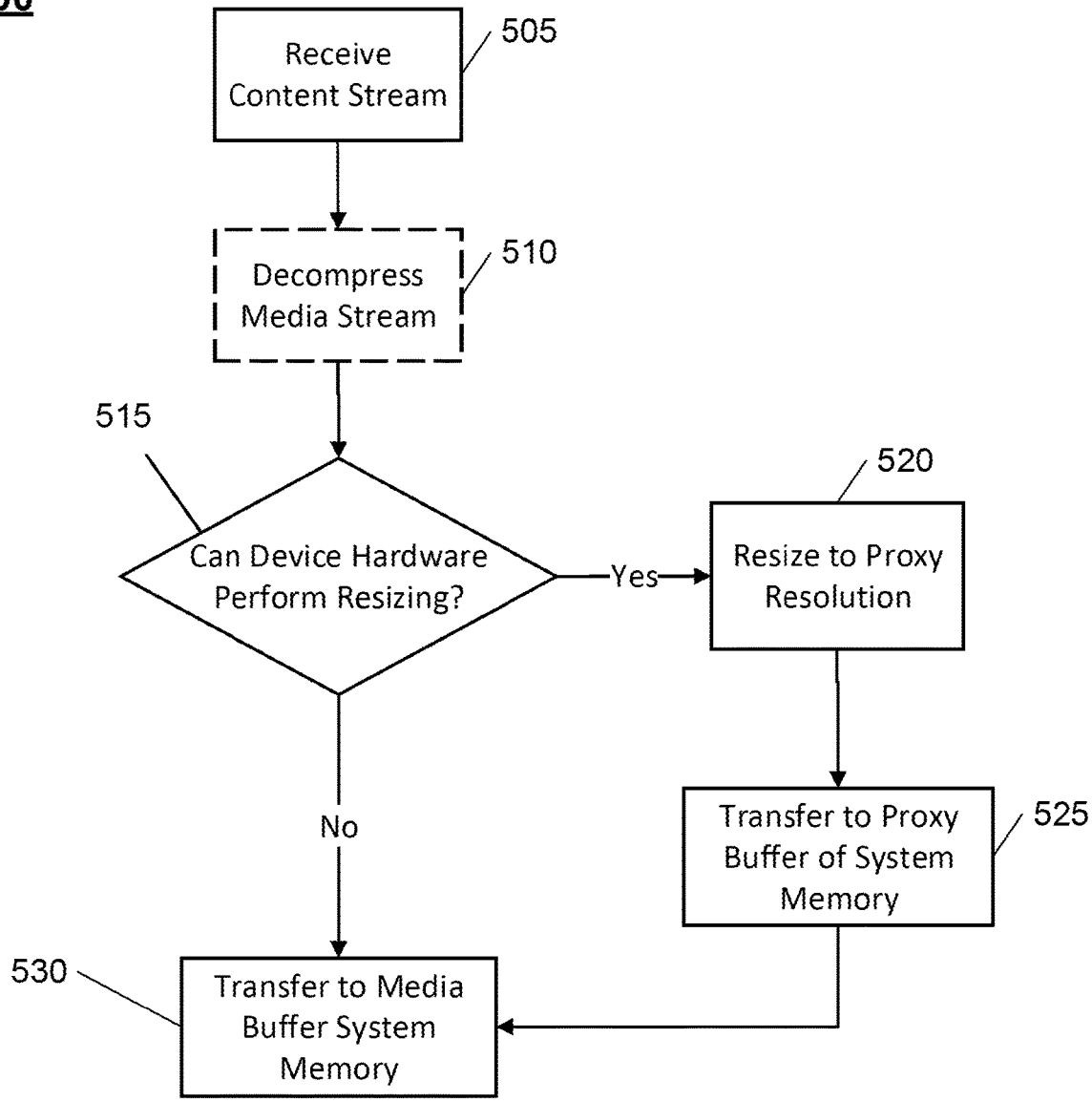
FIG. 5 illustrates a flowchart for a media production method for resizing received content streams to generate image data for a multiviewer device according to an exemplary aspect.

FIG. 5 illustrates a flowchart for a media production method for resizing received content streams to generate image data for a multiviewer device according to an exemplary aspect. It is noted that the image processing and resizing algorithms shown in FIG. 5 can be performed by any receiver and/or component thereof in system 100, including media production system 101 and/or codec 105, for example. Upon performing the resizing of the received content streams, the content streams can be transferred to the media buffers of system memory 124 of multiviewer 112.

Initially, at step 505, the receiver receives one or more media content streams from one or more of the content generating devices 108A, 108B, 110 and/or 111, for example. Optionally (as shown in dashed lines), if the received content stream is received in a compressed format, the receiver is configured to decompress the media stream for image processing at step 510. Next, at step 515, the media production system determines whether the device (i.e., the particular receiver) is configured to perform resizing. If YES, the receiver performs a resizing or rescaling to a proxy resolution at step 520 and is then transferred to the proxy buffer of system memory 124 at step 525. For example, if the receiver is located remotely from multiviewer 112, the scaled proxy content can be transmitted by receiver to the communication interface 126 and loaded to system memory 124 accordingly.

Moreover, if the receiver device is not configured for accelerated resizing, the method simply transfers the received stream to the media buffer of system memory 124 of multiviewer 112. Effectively, by providing the accelerated resizing functionality and algorithm on a receiver located remote to multiviewer 112 (e.g., in a cloud computing environment), the overall video production system provides a highlight dynamic and flexible system to manage incoming content streams to be displayed in a plurality of tiles (i.e., PIP windows) on the display screen 116 of multiviewer 112. Effectively, the system and method disclosed herein is configured to manage the memory bandwidth and resources required for memory load (e.g., by a peripheral component interconnect (PCI) express bus) from system memory 124 to GPU memory 121. In turn, the CPU of the multiviewer 112 is freed up by reducing this memory load and bandwidth consumption.

Figure 6:
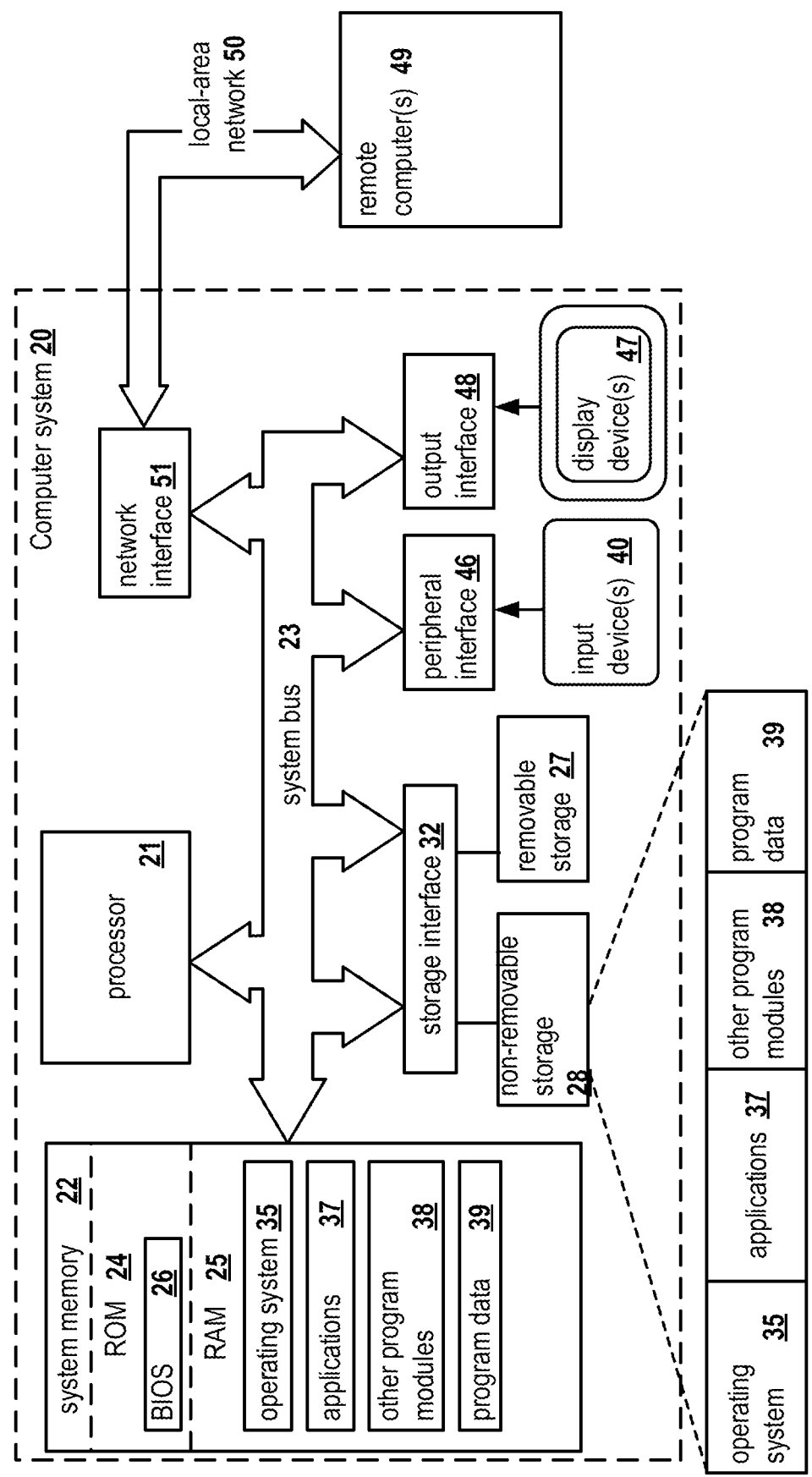
FIG. 6 is a block diagram illustrating a computer system on which aspects of systems and methods for providing a virtualized production switcher for media production according to an exemplary embodiment.

FIG. 6 is a block diagram illustrating a computer system on which aspects of systems and methods for providing the image generation and memory management for a multiviewer device in a media production environment according to an exemplary embodiment. It should be noted that the computer system 20 can correspond to any computing system configured to execute the disclosed systems and method described herein or any components therein. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter, and can be configured to generate user interface 205, for example. In addition to the display devices 47, the computer system 20 may be equipped with other peripheral output devices (not shown), such as loudspeakers and other audio-visual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Moreover, the remote computer (or computers) 49 can correspond to any one of the remote processing nodes or client devices as described above with respect to FIG. 1 as well as generally to a cloud computing platform for configuring the media production system.

Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet (e.g., Internet 103). Examples of the network interface 51 may include an Ethernet interface, a Frame Relay interface, SONET interface, and wireless interfaces.

In general, it is noted that the exemplary aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. As described above, a module can refer to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIGS. 1 and 2, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A system for displaying content streams on a multiviewer device, the system comprising:
    a multiviewer having a display screen with a predetermined layout configured to respectively display a plurality of contents streams in a plurality of tiles thereon, with each of the plurality of tiles having a predetermined size with a respective allocated number of total pixels;
    a receiver configured to receive a content stream of media content and determine whether a respective tile designated for the content stream is above a predetermined threshold defined by a total number of pixels;
    a graphics processing unit (GPU) having an internal memory configured to store image data, with the GPU configured to resize the image data loaded in the internal memory for display in a respective tile of the plurality of tiles of the multiviewer; and
    an image decimation controller configured to perform a decimation of the content stream by removing a predetermined number of lines from each frame of the content stream before loading the content stream to the internal memory of the GPU as the image data for resizing and display on the respective tile of the multiviewer;
    wherein the receiver is configured to load the content stream to a full resolution buffer in a system memory to be transferred to the internal memory of the GPU if the respective tile designated for the content stream is above the predetermined threshold, wherein the receiver is configured to load the content stream to a proxy buffer of the system memory if the receiver determines that the content stream is a proxy stream of the media content and the respective tile designated for the content stream is above the predetermined threshold, wherein the receiver is configured to load the content stream to the full resolution buffer in the system memory if the receiver determines that the content stream is not a proxy stream of the media content and the respective tile designated for the content stream is less the predetermined threshold, such that the image decimation controller performs the decimation to delete the predetermined number of lines before the content stream is loaded in the internal memory of the GPU as the image data and resized for display on the respective tile of the multiviewer.

2. The system for displaying content streams on a multiviewer device according to claim 1, wherein the image decimation controller is configured to perform the decimation of the content stream by removing a predetermined number of horizontal lines from each frame of the content stream before loading the content stream to the internal memory of the GPU.

3. The system for displaying content streams on a multiviewer device according to claim 2, wherein the image decimation controller is configured to perform the decimation based on a dynamic decimation factor that sets the predetermined number of horizontal lines from each frame to be removed.

4. The system for displaying content streams on a multiviewer device according to claim 3, wherein the dynamic decimation factor is set based on a size of the received content stream with a first decimation factor being applied to tiles having a first size and a second decimation factor that is less than the first decimation factor and that is applied to tiles having a second size that is physically smaller than the first size.

5. The system for displaying content streams on a multiviewer device according to claim 1, wherein the predetermined threshold is based on one of a relative size or ratio of the respective tile designated for the content stream compared to the display screen with the predetermined layout.

6. The system for displaying content streams on a multiviewer device according to claim 1, further comprising a content transcoder communicatively coupled to the multiviewer and configured to resize the content stream before transmitting the resized content stream to the receiver.

7. The system for displaying content streams on a multiviewer device according to claim 1, wherein the plurality of tiles are configured to display a plurality of content streams including at least one content stream from a content generating device and at least one composite video image that displays the at least one content stream with a video effect applied thereto.

8. A system for displaying content streams on a multiviewer device, the system comprising:
   a receiver configured to receive a content stream of media content and determine whether a respective tile of a multiviewer that is designated for the content stream is above a predetermined threshold defined by a total number of pixels of an image frame of the content stream;
   a graphics processing unit (GPU) having an internal memory configured to store image data, with the GPU configured to resize the image data loaded in the internal memory for display in the respective tile of the multiviewer; and
   an image decimation controller configured to perform a decimation of the content stream by removing a predetermined number of lines from each frame of the content stream before loading the content stream to the internal memory of the GPU as the image data for resizing and display on the respective tile of the multiviewer;

wherein the receiver is configured to load the content stream to a full resolution buffer in a system memory to be transferred to the internal memory of the GPU if the respective tile designated for the content stream is above the predetermined threshold, wherein the receiver is configured to load the content stream to a proxy buffer of the system memory if the receiver determines that the content stream is a proxy stream of the media content and the respective tile designated for the content stream is above the predetermined threshold, wherein the receiver is configured to load the content stream to the full resolution buffer in the system memory if the receiver determines that the content stream is not a proxy stream of the media content and the respective tile designated for the content stream is less the predetermined threshold, such that the image decimation controller performs the decimation to delete the predetermined number of lines before the content stream is loaded in the internal memory of the GPU as the image data.

9. The system for displaying content streams on a multiviewer device according to claim 8, further comprising:
   the multiviewer that includes a display screen with a predetermined layout configured to respectively display a plurality of contents streams in a plurality of tiles thereon, with each of the plurality of tiles having a predetermined size with a respective allocated number of total pixels,
   wherein the plurality of tiles are configured to display a plurality of content streams including at least one content stream from a content generating device and at least one composite video image that displays the at least one content stream with a video effect applied thereto.

10. The system for displaying content streams on a multiviewer device according to claim 8, wherein the image decimation controller is configured to perform the decimation of the content stream by removing a predetermined number of horizontal lines from each frame of the content stream before loading the content stream to the internal memory of the GPU.

11. The system for displaying content streams on a multiviewer device according to claim 10, wherein the image decimation controller is configured to perform the decimation based on a dynamic decimation factor that sets the predetermined number of horizontal lines from each frame to be removed.

12. The system for displaying content streams on a multiviewer device according to claim 11, wherein the dynamic decimation factor is set based on a size of the received content stream with a first decimation factor being applied to tiles having a first size and a second decimation factor that is less than the first decimation factor and that is applied to tiles having a second size that is physically smaller than the first size.

13. The system for displaying content streams on a multiviewer device according to claim 8, wherein the predetermined threshold is based on one of a relative size or ratio of the respective tile designated for the content stream compared to the display screen with the predetermined layout.

14. The system for displaying content streams on a multiviewer device according to claim 9, further comprising a content transcoder communicatively coupled to the multiviewer and configured to resize the content stream before transmitting the resized content stream to the receiver.

15. A system for displaying content streams on a multiviewer device, the system comprising:
   a graphics processing unit (GPU) having an internal memory configured to store image data, with the GPU configured to resize the image data loaded in the internal memory for display in the respective tile of the multiviewer; and
   an image decimation controller configured to perform a decimation of a content stream of media content by removing a predetermined number of lines from each frame of the content stream before loading the content stream as the image data to the internal memory of the GPU for resizing and display on a respective tile of a multiviewer;
   wherein the content stream is loaded to a full resolution buffer in a system memory to be transferred to the internal memory of the GPU if a tile of the multiviewer that is designated for the content stream is above a predetermined threshold defined by a total number of pixels of an image frame of the content stream,
   wherein the content stream is loaded to a proxy buffer of the system memory if the content stream is a proxy stream of the media content and the tile of the multiviewer designated for the content stream is above the predetermined threshold,
   wherein the content stream is loaded to the full resolution buffer in the system memory if the content stream is not a proxy stream of the media content and the tile of the multiviewer that is designated for the content stream is less the predetermined threshold, such that the image decimation controller performs the decimation to delete the predetermined number of lines before the content stream is loaded in the internal memory of the GPU as the image data.

16. The system for displaying content streams on a multiviewer device according to claim 15, further comprising:
   the multiviewer that includes a display screen with a predetermined layout configured to respectively display a plurality of contents streams in a plurality of tiles thereon, with each of the plurality of tiles having a predetermined size with a respective allocated number of total pixels,
   wherein the plurality of tiles are configured to display a plurality of content streams including at least one content stream from a content generating device and at least one composite video image that displays the at least one content stream with a video effect applied thereto.

17. The system for displaying content streams on a multiviewer device according to claim 15, wherein the image decimation controller is configured to perform the decimation of the content stream by removing a predetermined number of horizontal lines from each frame of the content stream before loading the content stream to the internal memory of the GPU.

18. The system for displaying content streams on a multiviewer device according to claim 17, wherein the image decimation controller is configured to perform the decimation based on a dynamic decimation factor that sets the predetermined number of horizontal lines from each frame to be removed.

19. The system for displaying content streams on a multiviewer device according to claim 18, wherein the dynamic decimation factor is set based on a size of the received content stream with a first decimation factor being applied to tiles having a first size and a second decimation factor that is less than the first decimation factor and that is applied to tiles having a second size that is physically smaller than the first size.

20. The system for displaying content streams on a multiviewer device according to claim 15, wherein the predetermined threshold is based on one of a relative size or ratio of the respective tile designated for the content stream compared to the display screen with the predetermined layout.

21. The system for displaying content streams on a multiviewer device according to claim 16, further comprising a content transcoder communicatively coupled to the multiviewer and configured to resize the content stream.

\* \* \* \* \*